US006799081B1

(12) United States Patent
Hale et al.

(10) Patent No.: US 6,799,081 B1
(45) Date of Patent: Sep. 28, 2004

(54) FIBER PLACEMENT AND FIBER STEERING SYSTEMS AND CORRESPONDING SOFTWARE FOR COMPOSITE STRUCTURES

(75) Inventors: Richard D. Hale, Lawrence, KS (US); Virginia M. Vasey-Glandon, Florissant, MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 35 days.

(21) Appl. No.: 09/987,448

(22) Filed: Nov. 14, 2001

Related U.S. Application Data

(60) Provisional application No. 60/248,213, filed on Nov. 15, 2000.

(51) Int. Cl.[7] ............................. G06F 17/50; G06F 19/00
(52) U.S. Cl. ............................ 700/98; 700/118; 700/119; 703/7
(58) Field of Search ............................... 700/28, 31, 98, 700/182, 118, 119; 703/1, 2, 7; 345/420; 702/35

(56) References Cited

U.S. PATENT DOCUMENTS

| | | | |
|---|---|---|---|
| 4,534,813 A | | 8/1985 | Williamson et al. |
| 4,646,251 A | | 2/1987 | Hayes et al. |
| 4,849,913 A | | 7/1989 | Ward et al. |
| 4,937,768 A | | 6/1990 | Carver et al. |
| 4,945,488 A | | 7/1990 | Carver et al. |
| 5,006,990 A | * | 4/1991 | Ward et al. ................. 700/97 |
| 5,023,800 A | | 6/1991 | Carver et al. |
| 5,033,014 A | | 7/1991 | Carver et al. |
| 5,038,291 A | * | 8/1991 | Wang et al. ................. 700/98 |
| 5,119,309 A | | 6/1992 | Cavendish et al. |
| 5,197,013 A | | 3/1993 | Dundorf |
| 5,419,231 A | * | 5/1995 | Earle et al. ................. 87/1 |
| 5,636,338 A | * | 6/1997 | Moreton ................. 345/442 |
| 5,729,463 A | * | 3/1998 | Koenig et al. ................. 700/98 |
| 5,963,861 A | * | 10/1999 | Hanson ................. 455/456.1 |
| 5,984,511 A | * | 11/1999 | Vasey-Glandon et al. ...... 703/6 |
| 6,341,261 B1 | | 1/2002 | Vasey-Glandon et al. |
| 6,490,496 B1 | * | 12/2002 | Dacey ................. 700/118 |

FOREIGN PATENT DOCUMENTS

| | | |
|---|---|---|
| JP | 07-229183 | 9/1996 |

OTHER PUBLICATIONS

Chris Waldhart, "Analysis of Tow–Placed, Variable–Stiffness Laminates," Master's Thesis, Virginia Polytechnic Institute, Jun. 5, 1996, pp. 1–35.*

Brian Tatting and Zafer Gurdal, "Design and Manufacture of Tow–placed Variable Stiffness Composite Laminates with Manufacturing Considerations," 13th US National Congress of Applied Mechanics, Jun. 25, 1998.*

(List continued on next page.)

*Primary Examiner*—John Follansbee
*Assistant Examiner*—Aaron Perez-Daple
(74) *Attorney, Agent, or Firm*—Alston & Bird LLP

(57) ABSTRACT

A composite design optimization process for designing a laminate part includes steps for generating a globally optimized 3-D ply definition for a laminate part, optimizing the 3-D ply definition at the individual tow level, subsequently generating a feedback signal providing tow specific information, and modifying the 3-D ply and 3-D tow definition responsive to the feedback signal. A laminate part constructed using a composite design optimization process and a composite design optimization system used in designing a laminate part, comprising circuitry for generating globally optimized 3-D ply and 3-D tow definitions for a laminate part are also described.

20 Claims, 4 Drawing Sheets

OTHER PUBLICATIONS

Patrick Morelle, R. Radovcic, "CAD based optimization of composite structures," Proceedings of Sixth Int. Conference on OPT Mar. 16–18, 1999, pp. 311–320.*

B. Davidson, et al., "An Expert System for the Design and Analysis of Composite Structures", Am. Helicopter Society Conf. And Specialists Mtg. Sep. 21–23, 1993.

C.M.L. Wu et al., "A Knowledge based expert system for laminated composite strut design", Aeronautical Journal, Jan. 1991, pp. 1–20.

C.M.L. Wu, "Bolted joints in a laminated composite strut design expert system", Composite Structures 22, 1992, pp. 63–85.

D. Sriram et al., "Knowledge–Based Expert Systems in Structural Design", Computers & Structures, vol. 20, No. 1–3, pp. 1–9, 1985.

J. J. Shah et al., "Analysis of design abstraction, representation and inferencing requirements for computer–aided design".

J.P.H. Webber et al., "An Expert System for Laminated Plate Design Using Composite Materials", Computers & Structures, vol. 37, No. 6, p. 1051–1–67, 1990.

D.P. Costin et al., "Optimum Design of a Composite Structure with Manufacturing Constraints", Thin–Walled Structures 17, pp. 185–202, 1993.

H. Yoshiura, et al., "Top–Down Construction of 3–D Mechanical Object Shapes from Engineering Drawings", IEEE, Dec. 1984, pp. 32–40.

T.C. Woo, "Interfacing Solid Modeling to CAD and CAM: Data Structures and Algorithms for Decomposing a Solid", IEEE, Dec. 1984, pp. 44–49.

A.A.G. Requicha et al., "Representation of Geometric Features, Tolerances, and Attributes in Solid Modelers Based on Constructive Geometry", IEEE Journal of Robotics and Automation, vol. RA–2 No. 3, Sep. '86.

Y.H. Pao et al., "Memory Driven Feature–Based Design", Interim Report Feb. 1988–Dec. 1992.

Chris Waldhart, "Analysis of Tow–Placed, Variable–Stiffness Laminates," Mater's Thesis, Virginia Polytechnic Institute, Jun. 5, 1996, pp. 1–35.

Brian Tatting and Zafer Gurdal, "Design and Manufacture of Tow–placed Variable Stiffness Composite Laminates with Manufacturing Considerations," $13^{th}$ US National Congress of Applied Mechanics, Jun. 25, 1998.

Patrick Morelle and R. Radovcic, "CAD Based Optimization of Composite Structures," Proceedings of Sixth Int. Conference on OPT, Mar. 16–18, 1999, pp. 311–320.

A.L. Velocci, "R&D Unit Pressed to Save $1 Billion," Aviation Week and Space Technology, May 11, 1998, pp. 75–76.

E.H. Phillips, "Premier 1 Readied for First Flight," Aviation Week and Space Technology, Aug. 31, 1998, p. 39.

R. Flory and E. Bernardon, "Effect of Steering and Conformance Requirements on Automated Material Deposition Equipment," Charles Stark Draper Laboratory, Inc. technical capability document.

Jani J. Shah, Mary T. Rogers, Palat C. Sreevalsan, David W. Hsiao, Abraham Mathew, Anant Bhatnagar, Bongee B. Liou and David W. Miller, "The A.S.U. Features Testbed: An Overview," Arizona St. Univ. pp. 233–241.

V.P. McConnell, "Fiber–placed C–17 Landing Gear Pod Fairings Reduce Price and Parts—Carbon Fiber/Epoxy Unidirectional Towpreg," High Performance Composites, Jul./Aug. 1998, pp. 48–50.

* cited by examiner

FIBER PLACEMENT AND FIBER STEERING SYSTEMS AND CORRESPONDING SOFTWARE FOR COMPOSITE STRUCTURES

The instant application is based on Provisional Patent Application No. 60/248,213, which was filed on Nov. 15, 2000, and which Provisional Patent Application is incorporated herein by reference in its entirety.

BACKGROUND OF THE INVENTION

The present invention relates generally to composite fabrication. More specifically, the present invention relates to composite fabrication employing tow-optimized designs. Advantageously, corresponding system and software programs for generating a tow-optimized composite structure are also disclosed.

Historically, research efforts in connection with composite manufacturing technology have focused on performance, rather than cost, considerations. This trend changed in the 1990's when strict new cost guidelines were applied to emerging civil and military platforms, such as the Joint Strike Fighter.

The aerospace industry has responded to the low cost composites challenge by developing innovative manufacturing techniques, such as producing unitized parts with automated processes. The most significant technology promising reduced cost fabrication is the fiber placement process, which allows large, complex shaped composite structures to be produced faster, approximately 40% cheaper, and with greater quality than traditional approaches. Fiber placement has been used to manufacture military hardware such as the inlet duct of the Joint Strike Fighter (see the article by A. L. Velocci in *Aviation Week and Space Technology* (May 11, 1998. pp. 75–76) and the landing gear pod fairing of the C-17 transport (as discussed by V. P. McConnell in *High Performance Composites* (July/August, 1998. pp. 48–50)), as well as lighter aircraft for civil aviation (as mentioned in the report by E. H. Phillips in *Aviation Week and Space Technology* (Aug. 31, 1998. p. 39)). FIG. 1 depicts the inlet duct 5 of the Boeing Joint Strike Fighter (X-32) which duct is fabricated in accordance with the known fiber placement process.

Fiber placement is a modern, automated method of manufacturing a composite structure. This manufacturing method has received significant attention recently due to well-documented success in producing complex composite structures in a cost-effective manner. What is not well documented is the fact that the capabilities of existing fiber placement hardware far exceed the capabilities of current design engineering tools, particularly with respect to the ability to fabricate structures exhibiting steered or curvilinear fiber paths.

Fiber placement is a unique process combining the differential material payout capability of filament winding and the compaction and cut-restart capabilities of automatic tape laying. In the fiber placement process, narrow (~0.125 in.) strips or "tows" of resin impregnated fiber are drawn under tension across a tool geometry by a computer controlled head. This head is capable of delivering up to approximately thirty adjacent tows simultaneously, allowing for high production rates. The narrow tows provide precise control over fiber orientation and, since each tow can be controlled independently, thickness tapers on complex geometry are readily produced. It will be appreciated that the control of fiber adds and cuts (the start and stop of individual tows) is controlled by a computer via a CAD interface.

FIG. 2 illustrates a plurality of feed paths employed in one layer of a composite structure in making a predetermined bend. From FIG. 2 it will be apparent that the feed rate of each tow is also individually controlled, allowing the longer path, i.e., the outside tows, of a steered radius to feed faster than the shorter, i.e., inside, path tows. The ability to support differential tow feed rates combined with the ability to drop individual tows provides the opportunity to place fibers along a relatively tight radius with no degradation in component quality. Fiber steering is made possible by local compaction during placement of the fibers, with each of the impregnated tows having enough tack to overcome any sliding forces.

It should be mentioned that when tows are steered through a radius, the fibers on the outside of the radius are placed in tension and the fibers on the inside of the radius are placed in compression. However, since the fibers are inextensible, the fibers along the inside radius can buckle if the steering is severe. Industry quality assurance programs have demonstrated that using fiber placement technology, carbon/epoxy fiber path geometry can be tailored to a maximum steering radius of twenty inches with no loss in specimen quality. See the discussion by B. Mcilroy in the "Fiber Placement Benchmark and Technology Roadmap Guidelines (Final Report)," Air Force Research Laboratory contract F33615-95-2-5563 The Boeing Company, 1999). See also the article by R. Flory et al. entitled "Effect of Steering and Conformance Requirements on Automated Material Deposition Equipment." (Charles Stark Draper Laboratory, Inc. technical capability document). Tighter steering radii are possible if the extent of the steering is not severe, e.g., if the arc radius extends less than forty-five degrees. In contrast, tape laying equipment, i.e., equipment performing another automated process utilizing single bands of material approximately six inches in width, is restricted to maximum steering radii in excess of twenty feet, or almost no steering.

It should also be mentioned that typical fiber placed parts might generate anywhere from 2% to 15% scrap, compared with 50% to 100% for conventional hand layup, as discussed by R. Aarns (The Boeing Company) during the Technical Contribution Award speech delivered at AIAA St. Louis Section Honors and Awards Banquet (20 May, 1999). This reduced material scrap rate directly equates to acquisition cost savings due to reduced material usage. Furthermore, the large unitized structures capable of being fabricated equate to life cycle cost savings due to reduced nonrecurring costs, hands-on labor, and part tracking. Finally, the automated process leads to increased accuracy (and, thus, improved quality) and reduced costs due to fewer processing errors and scrapped parts. Each of these advantages has propelled fiber placement into the spotlight. Thus, at the present moment, designs are being developed and produced throughout the aerospace industry, which designs are equivalent to conventional hand layup components, but at reduced cost.

In this development frenzy, a key advantage, i.e., the previously mentioned capability of fiber steering, is being largely overlooked. For example, fiber steering offers potential weight savings by overcoming the restriction of discrete linear fiber orientations commonly associated with traditional composites. More specifically, with conventional hand layup composites, one starts with tape or fabric plies of linear fiber orientation, and assembles these into desired stacks of laminate families, i.e., combinations of various orientations in a preferential stacking sequence. Within a given component, there are two predominant design conditions to consider: (1) overall laminate thickness required; and (2) the proper combination and stacking of various lamina orientations. To change either thickness or orientation requires a point discontinuity in the plies, which necessitates a ply termination at a boundary between adjacent regions of differing orientation. However, current analytical techniques focus on laminate optimization and not ply optimization, thus producing design concepts that are not optimized for either manufacturability or cost of production.

In order to create an efficient design for any component, the component design process must include a detailed consideration of the specific manufacturing processes involved. However, recently implemented, popular automated methods for producing composite structures have yet to develop and distribute the detailed process advantages and limitations in a format that is accessible to the design engineer. As such, there are many preliminary, and in some cases detailed, designs violate absolute requirements of the chosen manufacturing process. This absence of available information in the earliest stages of the design process necessitates redefinition of components, often several times. Furthermore, incorrect or incomplete information with respect to manufacturing requirements results in technically correct but irrelevant analyses to "optimize" intermediate designs that are simply not producible.

The fiber placement process, however, allows tailoring of the composite structure within a ply level by placing composite tows along curvilinear paths. This capability offers the potential for optimized structural configurations by tailoring fiber paths within a ply to load paths of the component. This capability was precluded with hand layup fabrication techniques due to the prohibitive cost of the required hands-on labor. In short, there is now the potential to produce reduced weight fiber steered components with no increase in manufacturing cost. It is time to recall that performance issues can still be addressed within the confines of low-cost composite processing.

There are no tools available for preliminary design to enable a composite designer to visualize actual tow geometry prior to fabrication. Manufacturers of fiber placement hardware (Ingersoll and Cincinnati-Milacron) do provide sets of simulation software (Acraplace and Offline Programming System (OPS) software packages, respectively), but these require a complete definition of the ply boundaries to be manufactured as an input. In other words, these systems require a final detailed design before either quality or manufacturing concerns, or both, can be addressed. The designer's only recourse, then, is to define the composite structures as though they would be fabricated by conventional hand-layup techniques. This approach is paramount to ignoring the details of the specific manufacturing process, resulting in ignorance of the limitations of the process and an inability to exploit the advantages of the process. This late consideration of manufacturability generally results in several test components being fabricated to work out the actual details of the tow paths, and necessary design changes. This sort of trial and error manufacturing is not cost-effective.

Furthermore, it should be noted that since the initial design assumed a conventional hand-layup, there is no valid technique for comparing an optimal hand-layup versus an automated layup configuration. The definition for automated tows and plies are necessarily tainted by incomplete and often inaccurate requirements associated with a manual manufacturing process. What is needed is a process and associated system for predicting, defining, analyzing and visualizing actual tow geometry, to include quantifiable computational assessments of common geometric flaws such as tow gaps and overlaps. This process and system would overcome the identified limitations, and has not previously been disclosed.

The fiber architecture and, more specifically, the detailed local material orientations and thickness, is required to accurately determine the mechanical properties of the composite. Complex geometry can result in fiber orientations and thickness build-ups that are not readily apparent. Complex curvature can, and most likely will, result in a fiber path that is also curvilinear. This will result in continuously varying mechanical properties, which must be accounted for to achieve an accurate analytical prediction of the mechanical response. There are no tools available to predict these local variations in fiber orientation, or the existence of significant overlaps or gaps in adjacent tows. These details are simply ignored in the analysis, or assumed by some sweeping generalizations.

It should be mentioned that Northrop-Grumman has developed a system with capabilities similar to a few of those functions discussed in detail below. More specifically, Northrop-Grumman has a system capable of visualizing tow geometry, assessing certain quality measure such as gaps and overlaps, and defining local fiber orientation. Note that many of the requirements for this were developed in discussions with the inventors of the present invention on a contract funded by the Office of Naval Research. See the report entitled "Fiber Steering for Reduced Weight Affordable Composite Structure" (Contract N00140-95-2-J044 awarded to the Boeing Company by the Office of Naval Research Center of Excellence for Composites Manufacturing Technology (April 1997 to April 1998)). In particular, the concept of a closed-loop design process was a product of the inventors of the instant invention and other employees of The Boeing Company, and was partially disclosed to teammates on the referenced ONR contract. Northrop-Grumman apparently does not have a closed-loop system for design, analysis and manufacturing and does not have a system which will allow Northrop-Grumman to accurately assess the relative merits of various manufacturing methods. The definition of the Northrop-Grumman tow geometry may or may not be in true 3D space. In addition, the referenced system does not allow definition of the laminate solid, or documentation of the tows, plies, and cross sections.

Daimler-Chrysler has developed a system specifically tailored to the tape laying process. This system allows visualization of plies, but only after the detailed design definition. This system does provide some assistance for the development of the laminate solid, but in fact it treats plies in a manner opposite to that dictated according to the present invention. Daimler-Chrysler defines an ideal solid and then sections this solid to obtain apparent plies. The Daimler-Chrysler system apparently does not incorporate more than fundamental rules for manufacturability and does not provide the preliminary designer with any tools for evaluating design efficiency. Moreover, the system does not provide any visualization capability for a tow, does not provide any mechanism for identifying true local fiber orientation, and does not allow investigations into relative quality of alternate designs. The system also does not provide the capability for a comparative study between manual and automated manufacturing methods.

Vistagy, Inc. is currently developing a fiber placement interface for their FiberSim family of composite development tools. The fiber placement interface is intended to automatically generate fiber placement data files from within their CAD system directly from the 3D model of the composite part. As with their current Composite Engineering Environment, this differs from the process and system disclosed herein in that it requires a full 3D definition of the structure prior to the simulation for individual tows, and it does not fully account for tows in true 3D space. The process and system described herein encompass the process for preliminary design through detailed design and manufacturing, enabling design simulation of tows in 3D space concurrently with the development of the full 3D definition of the structure. It is also worth noting that individuals currently developing this software were briefed on technology relating to this disclosure under a nondisclosure agreement prior to May, 1998.

It should be apparent that if the individual pieces of the design, analysis, and testing methodology are not available, then clearly the process is not understood. There are no tools available to the composite designer that allows him/her to evaluate alternate steering patterns during either preliminary or detailed design. As such, current fiber placed components are designed in the same manner as conventional hand layup components. The details of the manufacturing process are not considered in the design stage, which necessarily limits the efficiency of produced designs. The limitations of existing composite design tools for complex fiber placed components has been experienced by the authors in applications to include defining the ply details for the inlet duct of the Boeing Joint Strike Fighter demonstrator (FIG. 1).

What is needed is a process that provides an integrated design for manufacturing/fiber steering capability for fiber placement that achieves optimum structural efficiency while producing affordable primary composite structures. What is also needed is analytical methodologies for steered fiber composites, linked to design tools which encompass the overall process flow and which allow parallel considerations for manufacturability and mechanical performance. It will be appreciated that this combination of tools will allow optimization for cost as well as weight. Thus, what is needed are tools and processes for design, analysis and automated manufacturing of composite materials and structures using techniques, e.g., fiber placement or tape laying, which integrate into an existing system and methodology which encompass a knowledge base for hand-layup manufacturing of composite materials and structures. The combination of these two techniques is clearly unique, and offers, for the first time, the capability to accurately assess competing methods of composite fabrication.

SUMMARY OF THE INVENTION

Based on the above and foregoing, it can be appreciated that there presently exists a need in the art for tools and corresponding processes that overcome the above-described deficiencies. The present invention was motivated by a desire to overcome the drawbacks and shortcomings of the presently available technology, and thereby fulfill this need in the art.

The present invention offers significant increases in design and analysis capability for automated composite manufacturing processes such as fiber placement. This increased capability has the potential to offer significant weight savings in composite structural applications, at no additional cost. Other industries will realize the benefits of this research program as they explore the advantages of composite materials and begin to become involved with fiber placement.

According to one aspect, the present invention provides a composite design optimization process for designing a laminate part including steps for generating a globally optimized 3-D ply definition for a laminate part, optimizing the 3-D ply definition at the individual tow level, subsequently generating a feedback signal providing tow specific information, and modifying the 3-D ply and 3-D tow definition responsive to the feedback signal.

According to a further aspect, the present invention provides a laminate part constructed using a composite design optimization process for designing a laminate part comprising steps of generating a globally optimized 3-D ply definition for a laminate part, and optimizing the 3-D ply definition at the individual tow level, subsequently generating a feedback signal providing tow specific information, and modifying the 3-D ply and 3-D tow definition responsive to the feedback signal.

According to a still further aspect, the present invention provides a composite design optimization system used in designing a laminate part, comprising circuitry for generating a globally optimized 3-D ply definition for a laminate part, circuitry for optimizing the 3-D ply definition at the individual tow level, circuitry for subsequently generating a feedback signal providing tow specific information, and circuitry for modifying the 3-D ply and 3-D tow definition responsive to the feedback signal.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

Figure 1:
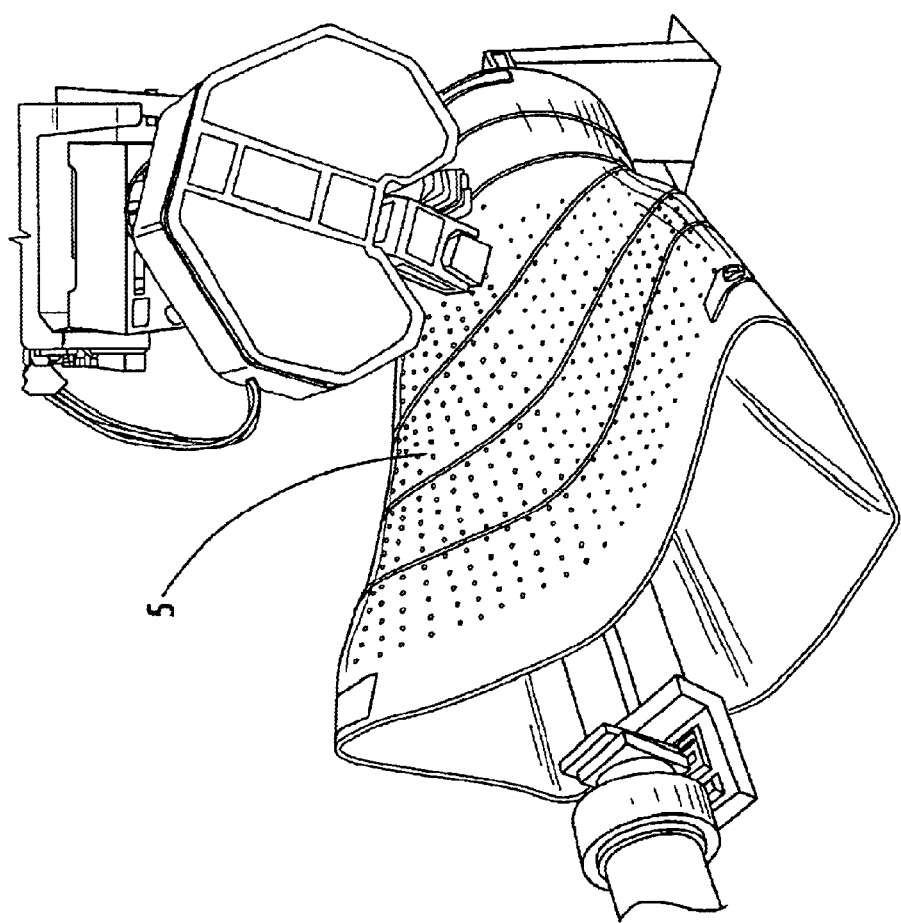
FIG. 1 depicts the inlet duct of the Boeing Joint Strike Fighter (X-32) which duct is fabricated in accordance with the known fiber placement process.
Figure 2:
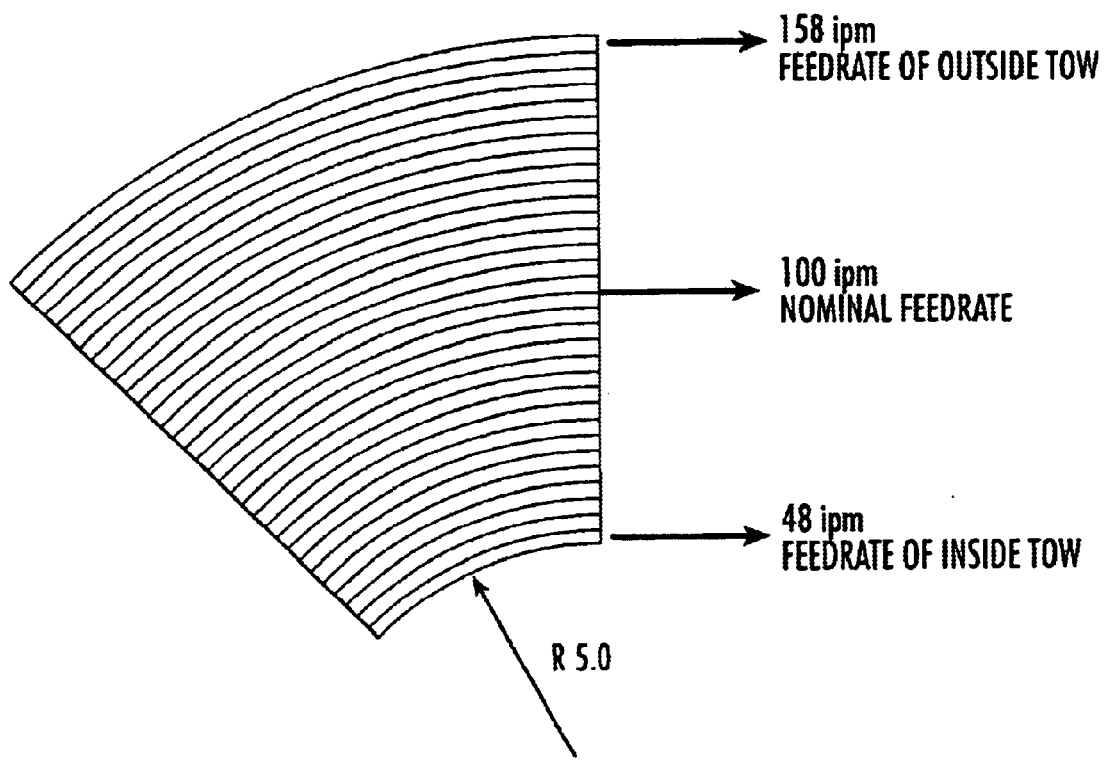
FIG. 2 illustrates the difference in localized feedrate across the surface of a composite structure.

The preferred embodiments of the present invention remedy the problem of producing technically correct but irrelevant analyses to "optimize" intermediate designs that are not producible by establishing a process and system which places detailed manufacturing information and requirements at the fingertips of preliminary design engineers. Advantageously, this information is linked to an accurate and robust definition of the geometry for the smallest manufacturable portion of a fiber placed structure, i.e., the tow. It will be appreciated that this detailed knowledge of the tow in 3D space is unique, and will facilitate an assessment of true fiber orientations at any point in space (and thus true mechanical properties). It will also facilitate assessment of the quality, which includes the severity of overlaps and gaps in adjacent tows and material orientation limitations, and the final 3D structural geometry to which adjacent parts must mate.

It should be mentioned that McDonnell-Douglas has been involved in the development of integrated design and analysis systems. This involvement resulted in a patented process and corresponding software package known as the Parametric Composite Knowledge System (PACKS). See U.S. Pat. No. 5,984,511, which patent is incorporated herein, in its entirety, by reference. The PACKS process and system "automate 3-D composite part definition to the ply level by linking the functions of design, analysis, and manufacturing with a parametric design process." This tool was recently piloted on the Boeing Joint Strike Fighter Technology Demonstrator program, and use of the tool allowed completion of 47 electronic definitions and complete build-to package releases in ten weeks, resulting in documented cost savings of 60% over conventional methods. Although this system greatly simplifies the definition of plies, the original patent disclosure does not currently address the additional manufacturing requirements for tows. The existing PACKS tools provide functionality for ply definition in true 3D space, development of the laminate solid, and documentation of plies and cross-sections. Each of these capabilities is available in, i.e., integrated into, the exemplary embodiments of the present invention discussed hereafter.

It will be appreciated that the inventive process and system advantageously can be incorporated into the existing Parametric Composite Knowledge Based System (PACKS). The two systems share objects and methods, as appropriate, to facilitate a comparison of competing manufacturing methods. It should be noted that there is currently strong commercial interest in the PACKS system; there is expected to be similar interest in the additional fiber placement and fiber steering functions and corresponding modules. In fact, the fiber placement process is currently one of the hottest topics of research in the composites field and, as such, any available process improvements will be eagerly incorporated into existing composite development regimes.

It should also be mentioned that implementation of the fiber steering function provides weight reduction, i.e., savings, in structural composites. With automated manufacturing processes like fiber placement, this steering, and thus the weight savings, advantageously can be produced at no additional cost. The limiting factors in the realizing weight reduction benefits of fiber steering lie in shortcomings of current design and analysis capabilities. With fiber placement, industry is now in the unique position of having manufacturing capabilities that exceed the associated ability of the industry to design and analyze the composite structure.

In short, fiber placement is an automated manufacturing process that is capable of producing complex fiber paths; since it is not known how to exploit fiber placement, great pains are undertaken to avoid the condition. The procedures and design tools discussed enable the designer to explore, and ultimately exploit, the potential of fiber steering in designing, and ultimately fabricating, a composite structure which is both lower in weight and more affordable.

Figure 3:
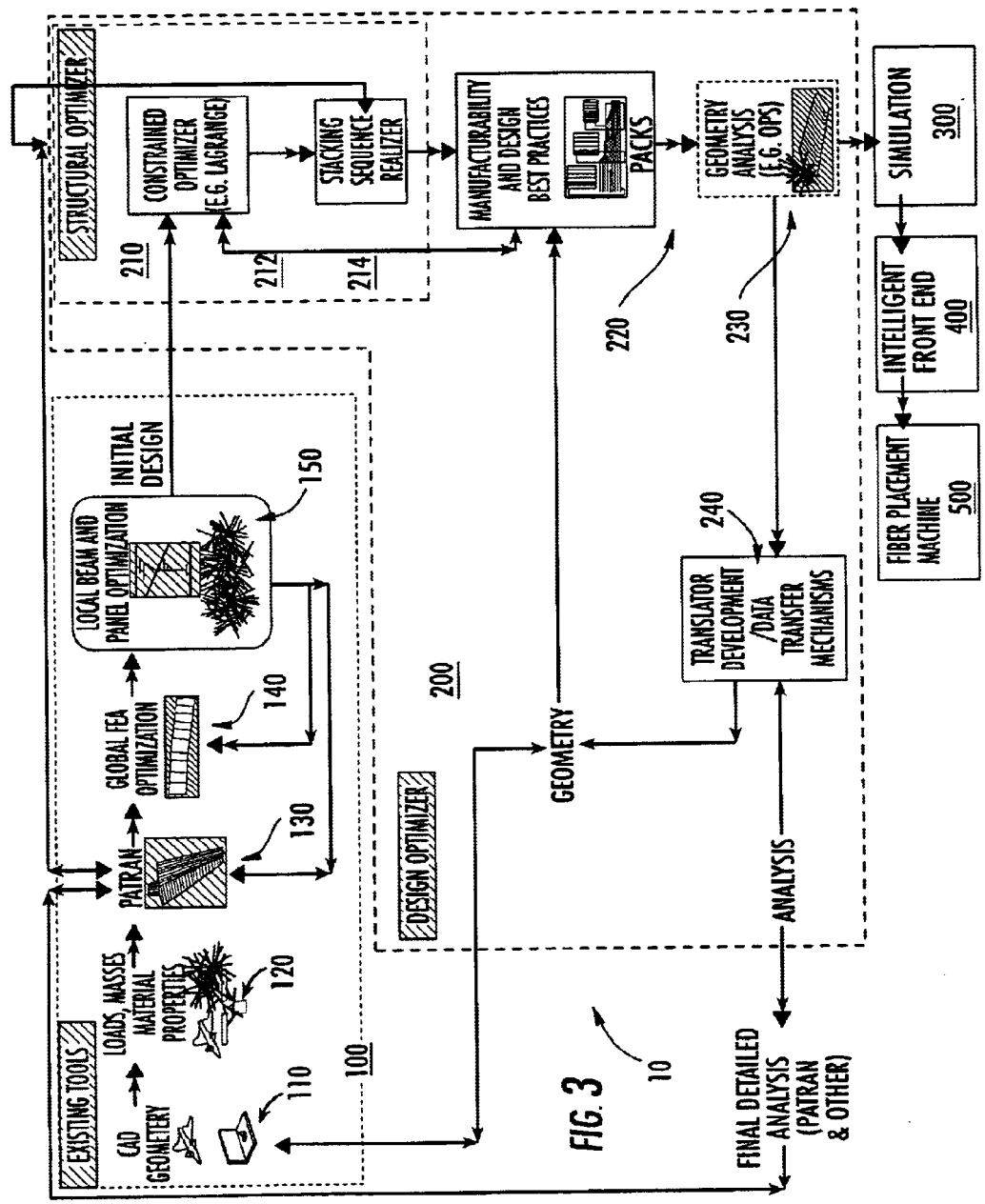
FIG. 3 is a high level block diagram illustrating the integration and linking of conventional design software and tools into a closed loop design system and software suite according to an exemplary embodiment of the present invention.

FIG. 3 is a high-level block diagram illustrating the integration and linking of conventional design software and tools into a closed loop design system and software suite according to an exemplary embodiment of the present invention. As shown in FIG. 3., conventional design software and developed or existing analytical tools 100 advantageously can be integrated with a design optimizer 200 to provide a closed loop design system 1. More specifically, the existing analytical tools 100 include a computer aided design (CAD) package 1 employed for initial part geometry development, an environmental package 120, wherein loads, masses, and material properties regarding the part are specified, a Patran module 130, a global finite element analysis optimizer 140 and a local beam and panel optimizer 150, arranged substantially in the recited order. It should be mentioned that Patran is a software environment offered by MSC, Inc. for finite element modeling; Patran enables the user to conceptualize, develop and test a product using computer-based simulation prior to making manufacturing and material commitments. More specifically, engineers employ Patran to create finite element models from their CAD parts, submit these models for simulation, and visualize the simulated model behavior. The results are then used to improve their product designs to better resist operating loads, reduce weight or material, or have higher performance. However, it will be appreciated that neither the input to nor output from the Patran module 130 is defined at the "tow" level. It will also be appreciated that the existing analytical tools 100 does not permit feedback, i.e., it is not a closed loop design system.

The existing analytical tools 100 advantageously can be converted to a closed loop design system operating at the tow level by integrating the existing analytical tools 100 with a design optimizer 200, e.g., a design optimizer software module. Preferably, the design optimizer 200 includes a structural optimizer 210, a manufacturability and design best practices (best practices) module 220, a geometry analysis module 230, e.g., an offline programming system (OPS) module, and a translator development and data transfer mechanism module (transfer module) 240. Each of these software modules will be discussed below. Before discussing these modules, it should be mentioned that the discussion regarding modules is equivalent to discussion of functions provided by tools. As such, the terminology is used interchangeably.

Still referring to FIG. 3, it will be appreciated that the structural optimizer 210 advantageously includes both a constrained optimizer 212 connected to a stacking sequence realizer 214. It will be appreciated that the constrained optimizer 212 can be the LaGrange optimization software developed by Daimler-Chrysler Aerospace. It will also be noted that an exemplary stacking sequence realizer 214 is disclosed in U.S. Pat. No. 5,984,511, which patent is incorporated herein, in its entirety, by reference. In an exemplary case, the output of the stacking sequence realizer 214 provides a feedback signal, i.e., information, to the Patran module 130, as well as a feedfoward signal to the best practices module 220. It should be mentioned that the best practices module 220 advantageously can be PACKS, which is described in detail in U.S. Pat. No. 5,984,511.

As illustrated in FIG. 3, the output of the geometry analysis module 230 is provided to both fiber placement machine 500 via simulation software 300 and an intelligent front end, which translates the final design into a form understandable by the machine 500, and the transfer module 240. The transfer module 240 advantageously can provide geometry data to one of the CAD module 110, the Patran module 130, and the best practices module 220.

As discussed above, the outline for an exemplary overall design system according to the present invention is illustrated in FIG. 3. It should be noted that this process allows for parallel consideration and therefore robust, detailed trade-off studies of the relative merits of competing automated and manual composite manufacturing methods. It will be appreciated that this is clearly unique.

Figure 4:
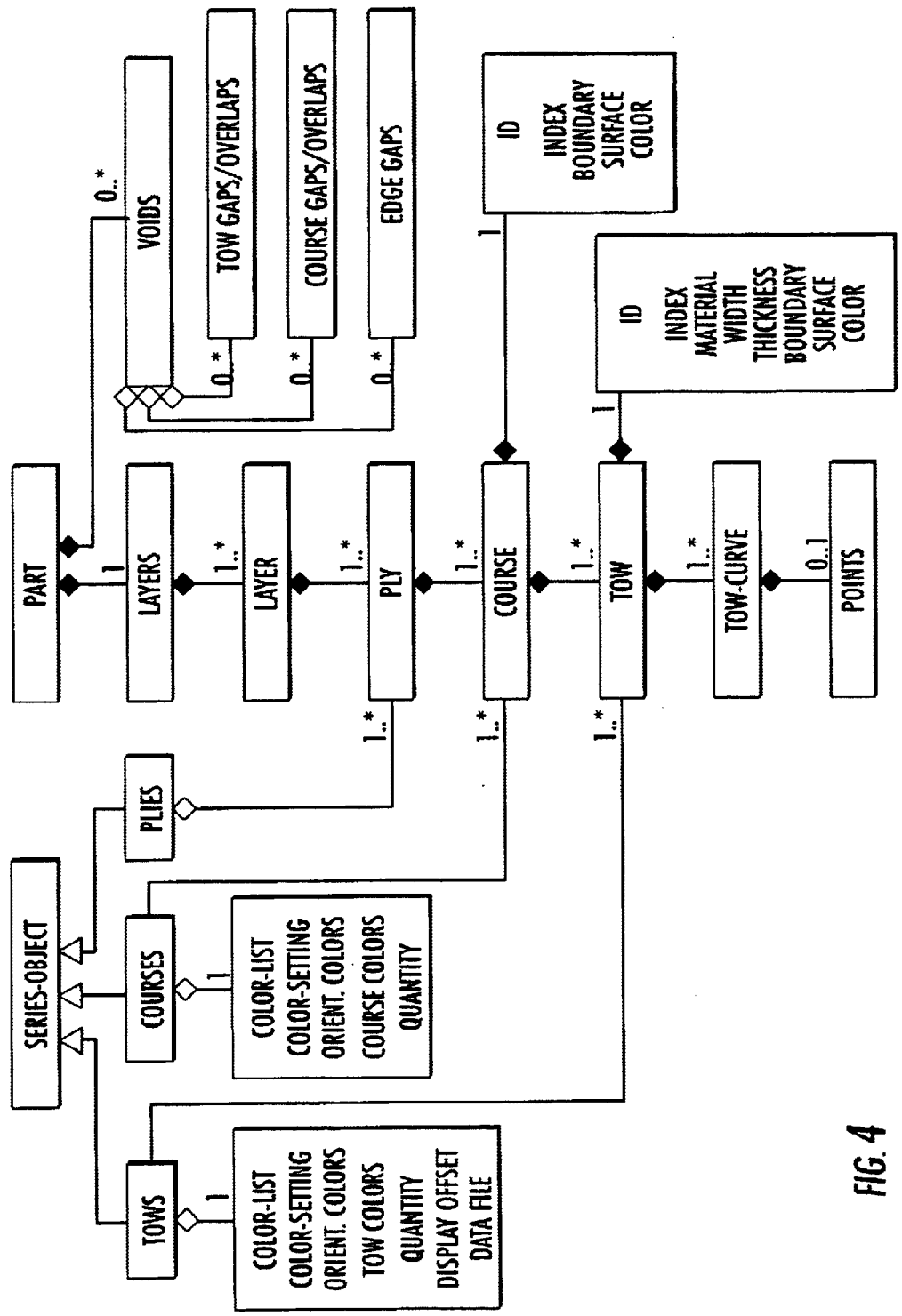
FIG. 4 is a conceptual block diagram of an object data structure that advantageously can be employed in the software and corresponding system according to the present invention.

Preferably, the design system for fiber placement and fiber steering according to the present invention employs an object-oriented programming language. The object structure for the fiber placement process is illustrated in FIG. 4. It should be noted that this object structure recognizes the relationship between critical geometric entities involved in the fiber placement process; in other words, it reduces the process design to the smallest entity actually used to fabricate components—the tow. This process is unique in that it defines all manufacturing rules, design guidelines, and analytical routines on the true 3-D geometric definition of individual tows. With conventional composites, the smallest entity used to fabricate components is the ply, and it is questionable how many existing processes adequately account for this in their preliminary design methodology. The patented PACKS process is one such routine that accurately accounts for true 3-D ply definition. This disclosure addresses a process that accurately accounts for true 3-D low definition.

The design system according to the present invention exploits capabilities of the Adaptive Modeling Language (AML) developed and marketed by TechnoSoft, Inc. AML is a knowledge-based language that allows integration of geometry and rules-based manufacturing, design and analysis methods. The original PACKS disclosure automates 3-D composite part definition to the ply level by linking the functions of design, analysis, and manufacturing with a parametric design process. So too will this extension automate 3-D composite part definition to the tow level by linking the functions of design, analysis, and manufacturing with a parametric design process.

It will be appreciated that the data for parts and objects are provided as class definitions, i.e., a description of a set of objects that share common attributes, relationships, and behavior. Moreover, it will be noted that the "PART" object defined in FIG. 4 is a composite aggregation where the layers and voids defined for the "PART" is meaningful and exists only in the context of the "PART." These relationships are denoted by solid diamond shapes. However, the "SERIES-OBJECT" and certain interstitial defects are simple aggregations, i.e., can be reused. These relationships are denoted by hollow diamonds.

The present invention provides preliminary and detailed design tools to enable a composite designer to visualize actual tow geometry prior to fabrication. Currently, several test components are generally fabricated to work out details of the tow paths. This sort of trial and error manufacturing is not cost-effective. The software solutions, i.e., the design system and corresponding software, allow visualizing actual tow geometry in true 3-D space, to include quantifiable computational assessments of common geometric flaws such as tow gaps and overlaps. Visualization may be obtained by tow, by course, by ply or by layer. It should be mentioned that the user is free to alter specifically selected display parameters, such as color, or may select from standard methods known to accentuate certain design features. Since the tows are modeled as true 3-D geometry, the model provides an accurate knowledge of volume and weight which is instantly available at any point in the design phase.

Moreover, detailed analyses may be performed for the existence of gaps or overlaps, the actual size and area of specific local flaws, and the actual size and area of total flaws within a prescribed area. These capabilities are unique, and allow heretofor unprecedented insight into component quality. Still referring to FIG. 4, it will be appreciated that the design system includes specific objects for these features and, thus, the system is able to define manufacturing rules based upon the properties of these objects. This is also a unique feature of the present invention.

In addition, these software solutions allow extraction of actual fiber orientations within each layer of a composite structure at discrete locations, providing true local laminate definition for detailed analysis. This can be accomplished by multiple methods. The underlying technique can be referred to as "drilling." At a specified position in space, a normal to the composite surface advantageously can be computed and then the software "drills" along this normal, and determines whether the normal is intersecting with the defined tows or other features. This unique capability is only possible due to the existence of definition of tows and other features in true 3-D space. It will be appreciated that "drilling" in this manner allows the user to determine the actual material thickness, the orientation of each layer, and the existence of certain features such as gaps in any local area. These details are required to accurately assess mechanical properties.

The design system and corresponding software according to the present invention also incorporates methods to link this powerful "drilling" capability to existing analytical methods. Any analysis routine capable of querying the PACKS model advantageously can extract detailed local material information by merely requesting the locations of interest. Of particular note is the ability to import an existing finite element model (or to create one within PACKS) and to export actual material properties. This unique capability is provided with user-selected methods for distributing the requested positions to correlate with the finite element discretization. Existing methods include but are not limited to: a) element center; b) element nodal; c) averaged element nodal; and d) element sampled. The latter incorporates several methods for defining local "drill" sites within the periphery of an element and averaging the "drill" results, to include simple linear arrays and area weighted or center weighted models.

Furthermore, the design tools, i.e., the design system and corresponding software modules, allow simulation of the design by producing theoretical paths of the tows for a set of user-defined manufacturing criteria, to include input tool geometry and desired path parameters. This detailed tow information historically has resided with the manufacturer of the fiber placement hardware and, thus, is not available in the design phase (and also is not within the control of the design company). Linking a system capable of predicting, defining, assessing, and documenting a manufacturable fiber placed or fiber steered component is unique.

Finally, and perhaps most importantly, the tools and processes for design, analysis and automated manufacturing of composite materials and structures using techniques such as fiber placement or tape laying advantageously can be integrated into an existing system which encompasses a knowledge base for hand-layup manufacturing of composite materials and structures. The existing, patented system (PACKS) provides significant capabilities for computing laminate solids, and for defining and documenting ply objects and cross-sections. These capabilities can be available to the disclosed system through inheritance and parallel object design architecture. The combination of these two is clearly unique, and offers for the first time the capability to accurately assess competing methods of composite fabrication within a single and common design system.

It should be mentioned that the technology for rules and manufacturing guidelines have been researched and documented in numerous research programs, both within The Boeing Company and throughout industry and academia. Prototype software exists for the visualization of actual tow geometry and for certain complex analytical calculations. Established routines exist for analytical requirements of orientation and thickness, and for quality requirements of tow overlaps and gaps. These capabilities have been implemented but still need to be adequately verified for accuracy and optimized for efficiency. In addition, techniques for predicting the initial tow geometry have yet to be fully developed, and as such can not presently be tested. Although this technology is not prepared for implementation, its potential value will be clearly indicated given the discussion above.

It should also be mentioned that the underlying technology of the PACKS tool and process have been validated and effectively used in production. The related PACKS tool was recently piloted on the Boeing Joint Strike Fighter Technology Demonstrator program, and use of the tool allowed completion of 47 electronic definitions and complete build-to package releases in ten weeks, resulting in documented cost savings of 60% over conventional methods. Similar savings can be expected when the current tool and process is actually utilized in the fiber placement process. In addition, the capabilities of this tool advantageously provide a mechanism to improve the efficiency of design produced for the fiber placement process, and may enable the use of steered fiber designs.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method of manufacturing a composite structure comprising individual tows, the method comprising the steps of:

specifying properties regarding the structure into analytical software tools;

integrating design optimization tools with the analytical software tools to define a closed loop design system, such that the closed loop design system provides a final design;

providing true 3-D geometric tow definition of individual tows of the composite to the closed loop design system to perform quantifiable computational assessments of common geometric flaws such as tow gaps and overlaps;

translating the final design into a form understandable by a fiber placement machine; and using the translated final design in order to manufacture the composite structure.

2. A method according to claim 1 wherein providing true 3-D geometric tow definition comprises visualizing actual tow geometry in 3-D space.

3. A method according to claim 2 wherein visualizing actual tow geometry in 3-D space further comprises selecting display parameters to accentuate design features.

4. A method according to claim 1 wherein performing quantifiable computational assessments of common geometric flaws further comprises:

analyzing the actual size and area of specific local flaws; and analyzing the actual size and area of total flaws within a prescribed area.

5. A method according to claim 1 wherein translating the final design comprises providing output from a geometry analysis module to the fiber placement machine via simulation software and an intelligent front end.

6. A method according to claim 1 wherein integrating design optimization tools with the analytical software tools comprises employing object-oriented programming language to provide object structure.

7. A method according to claim 1 wherein integrating design optimization tools with the analytical software tools comprises simulating the final design by producing theoretical paths of the tows for a set of user-defined manufacturing criteria.

8. A method according to claim 7 wherein simulating the design further comprises:

defining input tool geometry; and defining tow path parameters.

9. A method of manufacturing a composite structure comprising individual tows, the method comprising the steps of:

specifying properties regarding the structure into analytical software tools;

integrating design optimization tools with the analytical software tools to define a closed loop design system, such that the closed loop design system provides a final design;

providing true 3-D geometric tow definition of individual tows of the composite to the closed loop design system to perform quantifiable computational assessments of common geometric flaws such as tow gaps and overlaps;

analyzing material properties of tows of each layer of the composite structure by drilling normal to the composite structure in any local area of the composite structure;

translating the final design into a form understandable by a fiber placement machine; and using the translated final design in order to manufacture the composite structure.

10. A method according to claim 9 wherein analyzing material properties of each layer comprises providing user-selected methods to define local drilling positions that correlate with a finite element discretization.

11. A method according to claim 10 wherein providing user-selected methods to define local drilling positions further comprises:

defining drill sites within the periphery of a finite element; and averaging results of the drilling.

12. A method according to claim 9 wherein analyzing material properties of tows comprises determining the material thickness of each layer of tows.

13. A method according to claim 9 wherein analyzing material properties of tows comprises determining the orientation of each layer of tows.

14. A method according to claim 9 wherein analyzing material properties of tows comprises determining the existence of certain features in any local area.

15. A method according to claim 9 wherein translating the final design comprises providing output from a geometry analysis module to the fiber placement machine via simulation software and an intelligent front end.

16. A method according to claim 9 wherein integrating design optimization tools with the analytical software tools comprises employing object-oriented programming language to provide object structure.

17. A method according to claim 9 wherein providing true 3-D geometric tow definition comprises visualizing actual tow geometry in 3-D space.

18. A method according to claim 17 wherein visualizing actual tow geometry in 3-D space further comprises selecting display parameters to accentuate design features.

19. A method according to claim 9 wherein integrating design optimization tools with the analytical software tools comprises simulating the final design by producing theoretical paths of the tows for a set of user-defined manufacturing criteria.

20. A method according to claim 19 wherein simulating the design further comprises:

defining input tool geometry; and defining tow path parameters.

* * * * *